Jan. 16, 1940.   J. C. WILLIAMS   2,187,257
VALVE
Filed Aug. 15, 1938

Inventor
John C. Williams
By Philip A. Driedell
Attorney

Patented Jan. 16, 1940

2,187,257

UNITED STATES PATENT OFFICE 2,187,257

VALVE

John C. Williams, Reno, Nev., assignor to John C. Williams Corporation, a corporation of Nevada Application August 15, 1938, Serial No. 224,968

8 Claims. (Cl. 251—75)

This invention, a valve, is particularly adapted for fluid-of-submergence operation, and is particularly suited for control of dredges of the types illustrated and described in copending applications, Serial Number 93,971, filed August 3, 1936, for Clamshell dredge; Serial Number 173,840, filed November 10, 1937, for Clamshell dredge; and in connection with the dredge illustrated and described in copending application Serial Number 224,967, filed August 15, 1938, for Automatic control means for dredges.

The purposes of this invention are to provide a valve which is normally overbalanced by surrounding fluid pressures to keep the valve closed and sealed through the influence of the surrounding fluid until such time as the valve is cracked to equalize the pressure, by a force other than the surrounding fluid; to provide a valve with automatic means for limiting the rate of flow of fluid in one direction through the valve while permitting greatly increased rate of flow in the other direction; to provide a valve which is effectively sealed against pressures in either direction.

In describing the invention, reference will be had to the accompanying drawing, in which.

Figures 1, 2:
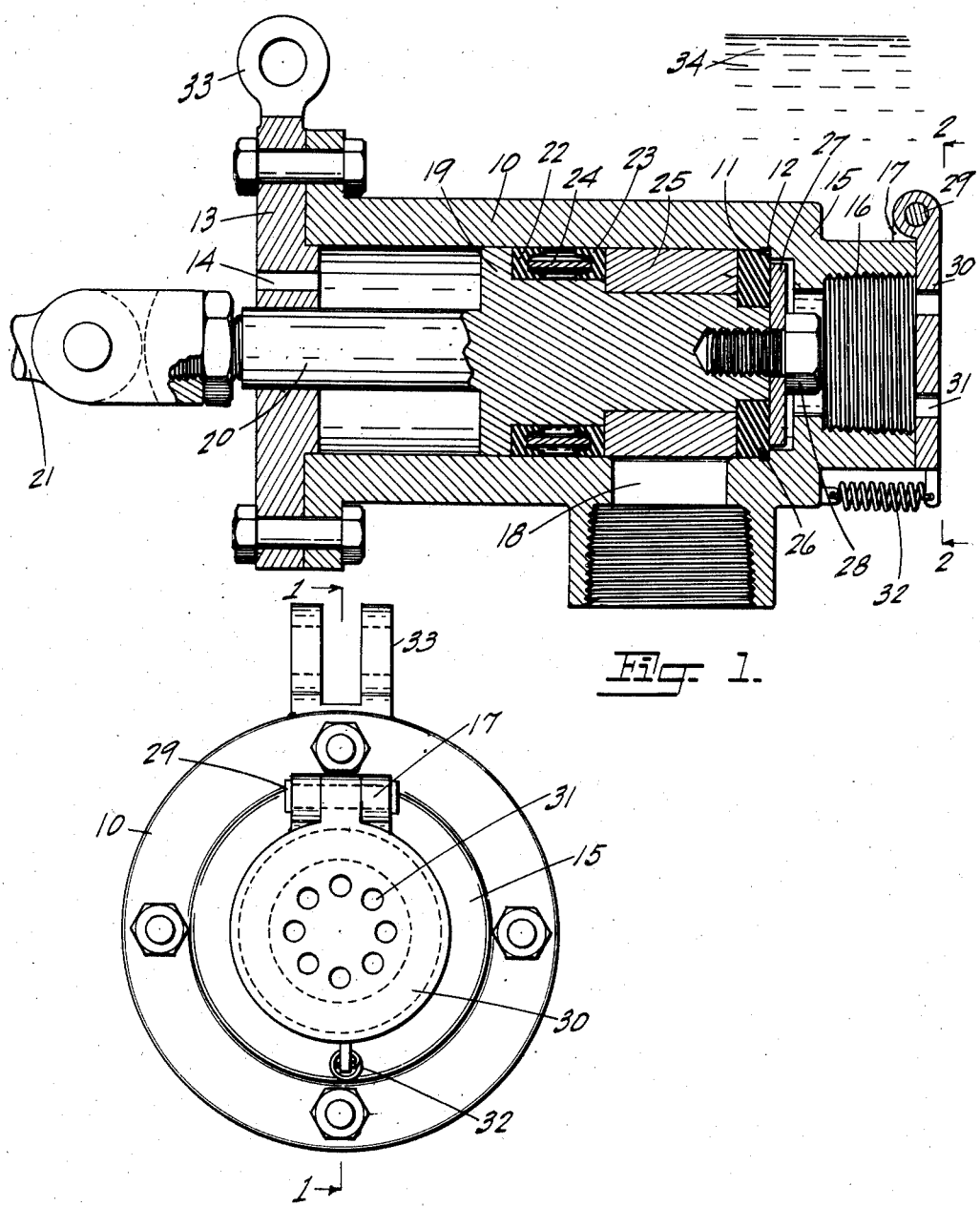
Fig. 1 is a longitudinal section through the invention and corresponds to a line 1—1 of Fig. 2.
Fig. 2 is an end view of Fig. 1 corresponding to a view 2—2 of Fig. 1, and in many cases will constitute the lower or bottom end.

The invention consists of a cylinder 10 having a seat 11 and an annular sealing recess 12 having one wall coincident with the plane of the seat 11. A head 13 is provided for the cylinder and has a passage 14 for admission of surrounding fluid.

The intake and discharge end 15 is illustrated as restricted and provided with a pipe tap 16 for connection to a developed source of power, such as compressed air, or for a discharge connection, such as a draw-off or drain for tanks. Ears are provided on the end 15 for a purpose to be later described. A connection 18 is provided for connection to a device, such as a cylinder of a prime mover (not shown) or for direct access to a surrounding fluid.

Mounted in the cylinder is a piston 19 having a piston or connecting rod 20 for connection to suitable valve "cracking" or releasing means, such as a rod 21.

Suitable packing, such as opposed cup leathers 22 and 23, spaced by means of a suitable spacer 24, provides an efficient seal for the piston within the cylinder, and this sealing means is retained by a ring 25 of suitable material, such as metal.

An annular ring 26 of rubber or other suitable resilient material is secured to the intake and discharge end of the piston by means of a washer 27 and screw 28.

Pivoted to the ears 17 at 29 is a control flap 30 which is provided with one or more apertures 31 of proper area to admit fluid in such volume as happens to be most desirable, and this flap is loaded by a spring 32 just sufficiently to keep it in contact with the end face of the walls of port 16. As is obvious, a counterweight (not shown) may readily be substituted for the spring, and when the end 15 is topmost, neither counterweight or spring will be required.

An ear 33 may be provided on the head of the cylinder in case the valve is to be operated by a hand lever.

The operation of the valve is as follows, assuming the valve is installed vertically and immersed in a fluid under pressure, such as water. The piston, through its own weight rests at the bottom of its stroke and the resilient ring 26 rests on the seat 11, and as the valve is lowered in the water, due to the greater area exposed at the top of the piston than within the confines of the inner edge of the seat 11, the pressure of the water in excess forces the cushion 26 onto its seat, and as the pressure of the water is increased the pressure between the rubber ring and its seat is increased, and eventually, after a predetermined pressure is attained through depth of submergence, the rubber bulges into the annular recess 12, increasing the effectiveness of the seal as the pressure is increased, while the sealing means 22, 23 prevents any leakage in either direction along the piston.

When the desired depth is reached, an upward pull on rod 21 of sufficient intensity to overcome the unbalanced condition of the pressure on opposite ends of the piston will crack the valve, equalizing the areas, and immediately balance the pressure, and practically no further effort will be required to raise the piston and maintain the valve full open.

The water of submergence 34 forces through the passages 31 at the relative rate and passes through the passage 18, and the valve is readily seated again by depression of the piston to seal the port 16, the overbalanced condition or condition of imbalance being re-established as soon as the ring 26 is firmly pressed to its seat, the unbalanced condition keeping the valve closed.

When the admitted water is to be discharged after removal from the water of submergence, retraction of rod 21 again opens the valve and the water is discharged through port 16, the flow of water overcoming the resistance of the spring 32, forcing the flap away from its seat and permitting the water to flow substantially unobstructedly.

This valve prevents too rapid inflow of fluid to a water-of-submergence-operated prime mover while permitting quick drainage. When operated at a depth of a thousand feet water-of-submergence-operated prime movers require a very small intake passage, entirely too small for drainage purposes.

I claim:

1. A valve comprising a cylinder open to surrounding fluid at both ends, one end of which forms a selective intake and discharge end having a first port and a plane internal annular seat terminating peripherally in an annular groove formed in the cylinder wall; a piston slidable in said cylinder and sealing means for each end of said piston sealing said piston against escape of fluid thereby and including an annular resilient sealing ring for said one end for cooperation with said seat and expansion into said groove and effectively sealing and reducing the exposed area of that end of the piston when seated, the other end of said piston being exposed to the pressure of the surrounding fluid through the other end of said cylinder; a second port opening into the side of said cylinder and normally sealed by said piston, whereby when said piston is seated on said seat, said second port is sealed and said piston is in a condition of imbalance due to the difference in area exposed at its opposite ends to surrounding pressures and urged to said seat by the pressure of surrounding fluid; cracking of said valve to expose the seat area to the surrounding fluid restoring said piston to a condition of balance with respect to said surrounding fluid; further retraction of said piston opening said second port for communication with said first port.

2. A valve comprising a cylinder open to surrounding fluid at both ends, one of which forms a selective intake and discharge end having a plane internal annular seat; a piston slidably sealed in said cylinder, said piston including an annular resilient sealing ring for cooperation with said seat and effectively sealing and reducing the exposed area of that end of the piston when seated, whereby when said piston is seated on said seat, said piston is in a condition of imbalance and urged to said seat by the pressure of surrounding fluid; cracking of said valve to expose the seat area to the surrounding fluid restoring said piston to a condition of balance for further operation; an annular groove formed in the wall of said cylinder with one of its walls formed coincident with the plane of said seat and providing a recess in which the periphery of the resilient ring bulges under predetermined surrounding pressures.

3. A valve comprising a cylinder open to surrounding fluid at both ends, one of which forms a selective intake and discharge end having a plane internal annular seat; a piston slidably sealed in said cylinder, said piston including an annular resilient sealing ring for cooperation with said seat and effectively sealing and reducing the exposed area of that end of the piston when seated, whereby when said piston is seated on said seat, said piston is in a condition of imbalance and urged to said seat by the pressure of surrounding fluid; cracking of said valve to expose the seat area to the surrounding fluid restoring said piston to a condition of balance for further operation; a seat formed externally of said intake and discharge end and a flap covering said end and lightly retained against said seat and having a passage therethrough to limit the rate of intake flow of surrounding fluid, said flap being urged away from said seat by discharge flow of fluid to permit substantially unrestricted discharge of fluid.

4. A valve comprising a cylinder open to surrounding fluid at both ends, one of which forms a selective intake and discharge end having a plane internal annular seat; a piston slidably sealed in said cylinder, said piston including an annular resilient sealing ring for cooperation with said seat and effectively sealing and reducing the exposed area of that end of the piston when seated, whereby when said piston is seated on said seat, said piston is in a condition of imbalance and urged to said seat by the pressure of surrounding fluid; cracking of said valve to expose the seat area to the surrounding fluid restoring said piston to a condition of balance for further operation; an annular groove formed in the wall of said cylinder with one of its walls formed coincident with the plane of the seat and providing a recess in which the periphery of said resilient ring bulges under predetermined surrounding pressures; a seat formed externally on said intake and discharge end and a flap covering said end and lightly retained against said seat and having a passage therethrough to limit the rate of intake flow of external fluid, said flap being urged away from said seat under the influence of fluid in process of discharge to permit substantially unhampered discharge of fluid.

5. A piston valve comprising a cylinder having a plane annular internal bottom seat terminating in an annular groove formed in the cylinder wall and a combined selective intake and discharge port within the confines thereof; a second port formed in the wall of the cylinder; a piston slidable in said cylinder and exposed at both ends to surrounding fluid pressures and normally sealing said second port; and having at one end an annular resilient member cooperating with said seat when the valve is closed, to seal the valve and create a condition of imbalance to surrounding fluid pressures and therethrough bulging said resilient member into said groove, varying the urgence of said member to its seat and the bulging thereof proportionate to the variation in surrounding pressures and thereby increasing the effectiveness of the seal as the surrounding pressure is increased; initial disruption of the seal by an extraneous force other than that of the surrounding pressure causing immediate restoration of said valve to a condition of balance to surrounding pressures for facile operation of the valve to open or re-closing positions.

6. A structure as claimed in claim 5, and a flap valve having restricted passages and associated with said confined selective intake and discharge port and normally maintained in closed position restricting the rate of intake to a predetermined value and movable to open position under the influence of discharging fluid permitting substantially unrestricted discharge of fluid through said port.

7. A valve comprising a cylinder having an internal plane annular seat at one end and a combined intake and discharge passage formed within the confines of said seat; a head for the other end and provided with a piston rod bearing and having a communicating passage for surrounding fluid; a port formed through the side wall of said cylinder adjacent said one end; a piston slidable in said cylinder and movable to a position from said one end to uncover said port for communication with said combined intake and discharge passage; peripheral sealing means for said piston and located in a position to seal against passage of fluid in either direction between said port and said other end; a resilient annular ring mounted on said piston for cooperation with said seat and reducing the area exposed to surrounding fluid on said one end relative to the other end to create a condition of imbalance when the ring is seated on its seat to increase the urgence and consequently the effectiveness of sealing as the surrounding fluid pressures are increased; a condition of balance being established by initial forced movement of said ring away from said seat for facile further operation of said valve.

8. A structure as claimed in claim 7, a seat formed externally of said one end and a flap mounted for cooperation with and coextensive with said seat and normally lightly urged to seat thereon and obstruct the intake passage and having a restricted passage for fluid thereto; said flap being urged from its seat under the influence of fluid being discharged to provide substantially unrestricted discharge of fluid from said intake and discharge passage.

JOHN C. WILLIAMS.